No. 720,505. PATENTED FEB. 10, 1903.
B. TUCKER.
NUT LOCK.
APPLICATION FILED SEPT. 10, 1902.
NO MODEL.
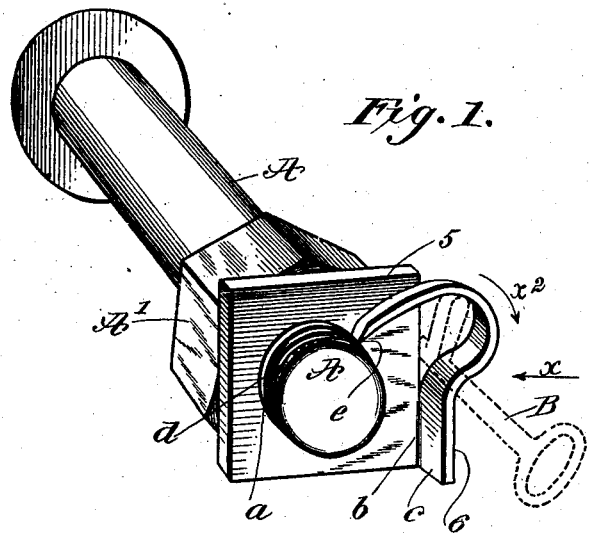
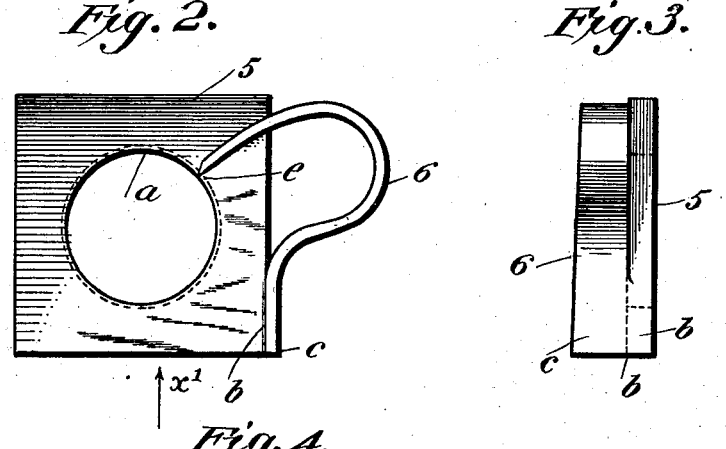
WITNESSES:
Paul Hunter
Wm P. Patton
INVENTOR
Benjamin Tucker
BY
ATTORNEYS.

UNITED STATES PATENT OFFICE.

BENJAMIN TUCKER, OF MONCTON, CANADA.

NUT-LOCK.

SPECIFICATION forming part of Letters Patent No. 720,505, dated February 10, 1903.

Application filed September 10, 1902. Serial No. 122,819. (No model.)

*To all whom it may concern:*

Be it known that I, BENJAMIN TUCKER, a subject of the King of Great Britain, and a resident of Moncton, in the Province of New Brunswick and Dominion of Canada, have invented new and useful Improvements in Nut-Locks, of which the following is a full, clear, and exact description.

The object of this invention is to provide a nut-lock of novel simple construction that may be readily applied upon the threaded end of a screw-bolt and that will hold a nut that is screwed upon the bolt from removal until the nut-lock is purposely released.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of a bolt, a nut thereon, and the improved nut-lock mounted on the threaded end of the bolt and arranged to secure the nut from accidental removal. Fig. 2 is a side view of the nut-lock. Fig. 3 is an edge view of the same seen in the direction of the arrow $x$ in Fig. 1, and Fig. 4 is an edge view of the nut-lock seen in the direction of the arrow $x'$ in Fig. 2.

The improved nut-lock is adapted for use on screw-bolts of any size without requiring a special construction of the bolt or the nut that screws thereon and which is to be held from unscrewing.

The nut-lock comprises a flat block 5, having suitable thickness and a preferably quadrangular form edgewise; but this is not imperative, as the block may be of any other angular shape on its peripheral edge. A transverse threaded orifice $a$ is formed in the block 5 at or near its center of such diameter and pitch in the thread as will permit said block to be screwed on the end of a bolt A against the nut A'. Upon one edge of the internally-threaded block 5 a spring-dog 6 is formed or secured by one end.

Preferably the dog 6 and block 5 are formed integrally of resilient metal, and an offset is produced at $b$, where the heel $c$ of the dog is joined with the block at one corner thereof, so that the body of the dog will be disposed at the normal outer side of the block 5, as is clearly shown in Figs. 1 and 2.

The material forming the dog 6 is tapered edgewise from the heel $c$ thereof to its free end, this sloping formation being produced on the outer edge, the opposite edge of the dog that is nearest to the outer face of the block 5 being parallel therewith and having sufficient clearance therefrom to permit the sharpened free end $e$ of the dog to vibrate a proper degree. The body of the dog 6 is curved into hook form, so as to dispose its free end $e$ at the edge of the threaded orifice $a$ and normally projecting somewhat across said edge, which will cause the sharpened free end of the dog to be pressed upon the thread $d$ of the bolt.

It will be seen that when the nut A' is screwed upon the threaded body of the bolt A a proper distance the block 5, if screwed on the bolt end, so as to forcibly impinge upon the nut A', will serve as a jam-nut and prevent a turning movement of the nut A' until the block 5 is unscrewed from the bolt end sufficient to release the nut.

When the block 5 is screwed onto the bolt end toward and into contact with the nut A', the sharpened free end $e$ of the dog 6 will be pressed upon the thread $d$ of the bolt by the resilience of the dog and bite thereon, so as to prevent a turning movement of the dog until it is released from enforced contact with the bolt-thread.

To conveniently release the spring-dog 6 from the thread $d$ of the bolt A, I may employ a key B, (shown by dotted lines in Fig. 1,) which implement, if inserted in the bow portion of the spring-dog and turned in the direction of the curved arrow $x^2$, will release the dog from its enforced contact with the bolt-thread $d$ and permit the nut-lock to be turned in a direction opposite from that indicated by the arrow $x^2$, which will release the nut A'.

As the improved nut-lock may be readily applied without injury to a bolt or nut it is to lock in place on the bolt-thread and may be removed or relaxed from pressure on the nut it has had locked engagement with, it will be seen that the improvement is very serviceable and adapted for general use on bolts of various sizes that have nuts which the improvement will effectively lock against accidental displacement.

Having thus described my invention, I claim as new and desire to secure by Letters Patent—

1. A nut-lock comprising a flat angular block having a central threaded orifice therein, and a spring-dog formed on one corner of the block by offsetting the heel of the dog from said corner, thus disposing the body of the dog at the outer side of the block, said dog having a hook-like form, and sloped on one edge from the heel to the free end thereof, that is projected over the edge of the threaded orifice.

2. The combination with a bolt and a nut screwed thereon, of a flat quadrangular block having a central orifice, a thread in said orifice that adapts the block to screw upon the bolt-thread and jam the block against the nut, and a hook-shaped spring-dog integral with the block and formed at one corner of the block by offsetting the heel of the dog, so that one edge of the dog will be parallel with the adjacent face of the block, the other edge thereof sloping toward the free end of the dog, which end is sharpened and projects over the threaded orifice in the block, so as to bear upon the bolt-thread when the block is jammed against the nut.

In testimony whereof I have signed my name to this specification in the presence of two subscribing witnesses.

BENJAMIN TUCKER.

Witnesses:
WM. H. A. STARKEY,
FRANCIS J. SWEENEY.